Aug. 30, 1938.    W. G. WEHR    2,128,387

BRAKE

Filed Sept. 19, 1935    2 Sheets-Sheet 1

INVENTOR.
WILLIAM G. WEHR
BY Kwis Hudson & Kent
ATTORNEYS

Aug. 30, 1938.  W. G. WEHR  2,128,387
BRAKE
Filed Sept. 19, 1935   2 Sheets-Sheet 2
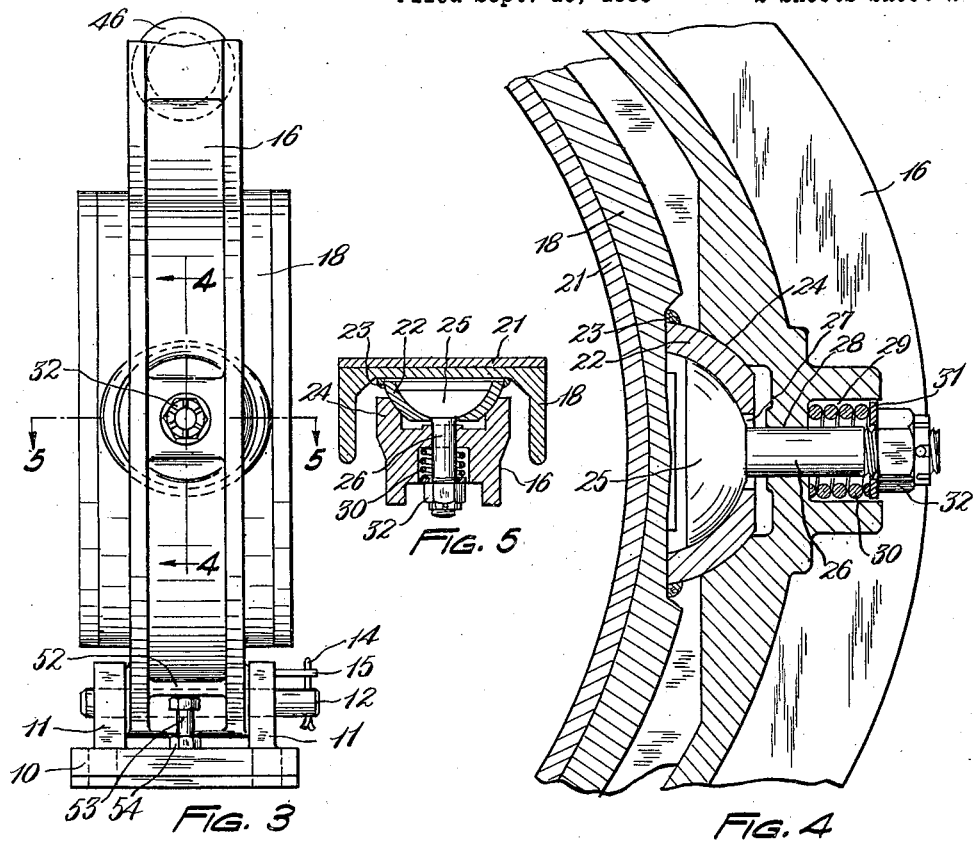
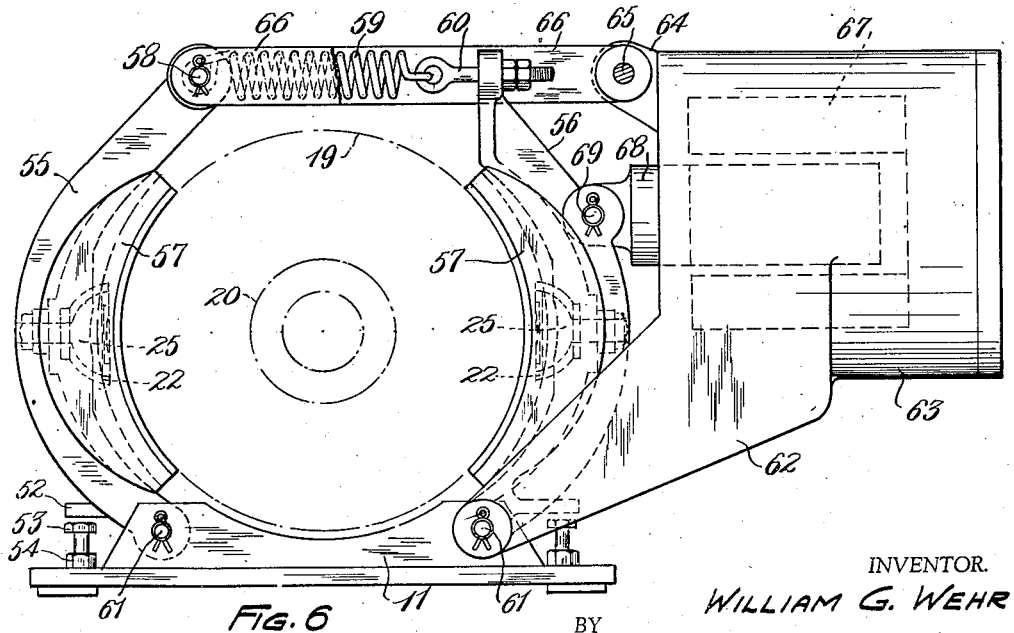
INVENTOR.
WILLIAM G. WEHR
BY
Kwis Hudson & Kent
ATTORNEYS Patented Aug. 30, 1938

2,128,387

UNITED STATES PATENT OFFICE 2,128,387

BRAKE

William G. Wehr, Wickliffe, Ohio, assignor to The Cleveland Crane & Engineering Company, Wickliffe, Ohio, a corporation of Ohio Application September 19, 1935, Serial No. 41,246

2 Claims. (Cl. 188—152)

This invention relates to improvements in brakes, particularly brakes that are operated by fluid pressure or magnetic means.

One of the objects of the invention is the provision of an improved mounting for the brake shoes which will permit of their adjusting themselves automatically to a uniform engagement with the drum regardless of such misalignment as may occur, thereby providing also a uniform clearance between the shoes and the drum when the brakes are retracted.

Another object is the provision of a simple and direct mounting of an operating cylinder and plunger, providing equalized action between the two brake shoes.

Other objects and features of novelty will appear as I proceed with the description of those embodiments of the invention which, for the purposes of the present application, I have illustrated in the accompanying drawings, in which Fig. 1 is a side elevational view of a brake apparatus embodying the invention, certain of the parts being shown in vertical section;

Fig. 3 is an edge or end view of the brake illustrated in Figs. 1 and 2;

Fig. 4 is a vertical sectional detail view on a larger scale showing the brake shoe mounting, this view being taken substantially on the line 4—4 of Fig. 3;

Fig. 5 is a cross-sectional view taken substantially on the line 5—5 of Fig. 3; and Fig. 6 is a side elevational view of a modified form of brake apparatus.

Figure 2:
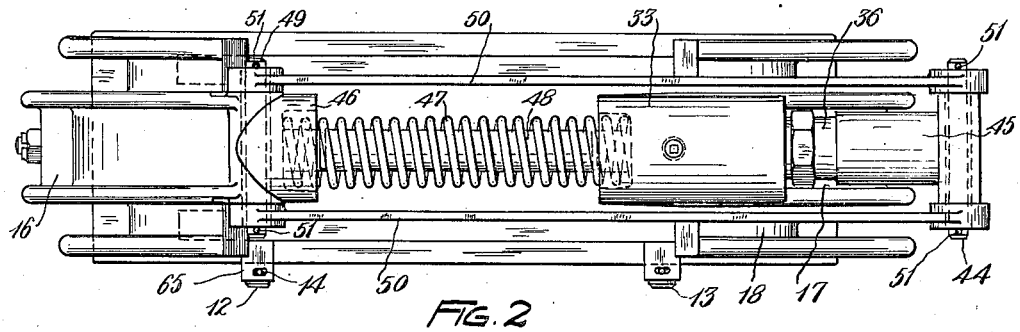
Fig. 2 is a plan view of the same.

While in certain of its aspects the brake mechanism of the present invention is applicable to various uses in vehicles as well as elsewhere, I have illustrated it herein as adapted for use upon stationary machinery. In the drawings, I have shown at 10 a base or support which is adapted to be bolted down or secured as desired to any suitable framework. On this base, and preferably integral therewith, there is a pair of spaced parallel bracket walls 11. Pivot pins 12 and 13 are mounted in opposed openings in the walls 11, each pin being held against rotation by a cotter pin 14, which is caused to extend through a hole in a fixed plate 15 as well as through a hole in the pin.

The lower end of a brake arm 16 is mounted on the pivot 12 between the two walls 11, and a second arm 17 is similarly mounted upon the pin 13. These arms are preferably made channel-shaped in cross-section for the sake of strength.

Two brake shoes 18, which may be of identical construction, are supported about midway of their length upon arms 16 and 17. They are adapted to engage with the periphery of a brake drum which is not illustrated, but the position of which is indicated in the drawings by dot and dash line 19. The drum is of course mounted upon a revoluble element, the latter being indicated in the drawings, at 20.

The shoes 18 are also preferably channel-shaped in cross-section, as shown in Fig. 5. They are faced on their inner surfaces with a brake lining 21. The connection between each brake shoe and its supporting arm is effected by a point such that movement of the shoe with respect to the arm is permitted in at least two directions perpendicular to each other. The preferred connection is by a ball and socket joint as illustrated. In the present instance, the ball is mounted on the arm and the socket on the shoe, although obviously these parts may be interchanged if desired. In the form illustrated, the socket 22 is a fragment of a hollow sphere that is attached to the shoe 18 by a weld 23. This sphere in turn has a bearing against a spherical surface 24 on the inner side of a thickened portion of the brake arm.

The inner surface of the hollow sphere 22 is engaged by the spherical head 25 of a bolt 26, the shank of the latter extending through a hole 27 in the hollow sphere and through a bore 28 in the arm 16 or 17, as the case may be, and into a counterbore 29 in the arm. A coil spring 30 seated within this counterbore bears upon a washer 31 surrounding the shank of the bolt and abutting against a nut 32 threaded onto the bolt, by means of which the washer is adjusted and the tension of the spring is controlled. The hollow sphere 22 is a socket so far as the bolt 26 is concerned, but it may also be considered a ball cooperating with the socket or spherical surface 24.

In operation the spring 30 yields whenever it is necessary for the shoe 18 to move on its mounting, this yielding action relieving the friction with which the hollow sphere 22 and ball 25 are held in engagement. After any such self-adjustment of the shoe however the spring 30 tends to hold the joint against accidental movement out of adjustment, so that the shoe remains in its adjusted position when pressure on the brake applying means is removed.

For applying the brakes, I use a cylinder and plunger connected respectively to the two arms 16 and 17. The upper extremity of the arm 17 is made with an enlargement 33 in which there is formed a bore 34 constituting part of the cylinder. There is also a counterbore 35 which is threaded for a part at least of its length to receive a sleeve 36 that constitutes the remainder of the cylinder, its bore being of the same diameter as the bore 34. Connecting passages 37 and 38 in the enlargement 33 lead from the inner end of the cylinder to a connection 39, by means of which a flexible conductor 40 is joined to the cylinder for the transmission of fluid pressure in either direction.

A plunger or piston 41 slides in the cylinder 34, 36 being provided at its inner end with a cup washer 42. At its outer end this plunger has a cross-head 43 through which extends a pin 44. A sleeve 45 attached to the cross-head embraces the sleeve 36 and excludes dirt.

On the free end of arm 16 there is a boss 46 in which is formed a socket to receive one end of a coil spring 47, the other end of which is received in a similar socket in the enlargement 33 of arm 17. A core piece 48 may be placed within the coils of the spring to prevent sidewise deflection under pressure.

A pin 49 extends through a transverse bore in boss 46. On the projecting ends of the two pins 44 and 49 I mount a pair of links 50, which are held in place by suitable means, such for instance as cotter pins 51. It will be apparent that when the piston 41 moves toward the right the pin 49 will be drawn toward the right and the arm 16 will be swung inwardly toward the brake drum.

Near the lower ends of arms 16 and 17 there are substantially horizontal projections 52 which are adapted to engage stops 53 that are threadedly mounted in the base 10, being held in any desirable position of adjustment by lock nuts 54. These stops serve to limit the outward swing of the arms 16 and 17 caused by spring 47 whenever brake applying pressure is relieved.

The operation of the brake above described will generally be by hydraulic means although compresed air or other fluid under pressure may be used if desired. To apply the brakes any suitable means may be employed to introduce fluid under pressure through conductor 49, connection 39 and passages 38 and 37 into the bore 34, whereupon pressure becomes available to move the cylinder, composed of bore 34 and sleeve 36, toward the left and to move the piston 41 toward the right simultaneously. The surfaces acted upon being of equal area, the pressure applied in opposite directions is also equal, and the pressure exerted by the two brake shoes is equalized. In order to retract the brakes suitable means is employed under the control of the operator to exhaust the fluid from the cylinder whereupon the spring 47 returns the brake arms to their normal position with the projections 52 resting upon the stops 53. The brake shoes themselves, being mounted upon ball and socket joints, are capable of tilting to a limited extent, in any necessary direction, and as the brakes are applied the shoes adjust themselves upon these joints so as to grip the brake drum evenly at all points. Likewise, when the brakes are withdrawn the shoes remain in this adjusted position due to the friction in the ball and socket joints exerted by springs 30. Hence the clearance between the drum and the brake shoes is always uniform.

The form of the invention illustrated in Fig. 6 is one in which magnetism is utilized instead of fluid under pressure. The armature of an electromagnet corresponds to the plunger or piston of the form of the invention first described, and the hollow coil of the electromagnet may be likened to the cylinder of the first described form. As illustrated, however, the electromagnet is adapted to hold the brake shoes away from the drum, normally, a spring being used to apply the brakes whenever the current through the magnet coil is interrupted.

The brake arms 55 and 56 are mounted substantially the same as the arms 16 and 17 before described, and carry brake shoes 57 which may be and preferably are supported on ball and socket joints, the same as brake shoes 18. At the upper end of arm 55 there is a transverse pivot pin 58. To this pin there is fastened one end of a contracting spring 59, the opposite end of which is connected to an eye bolt 60 that is adjustably mounted in the upper end of brake arm 56. The spring 59 pulls the brake arms 55 and 56 together and applies the brakes whenever the electro-magnet permits this to happen.

Figure 1:
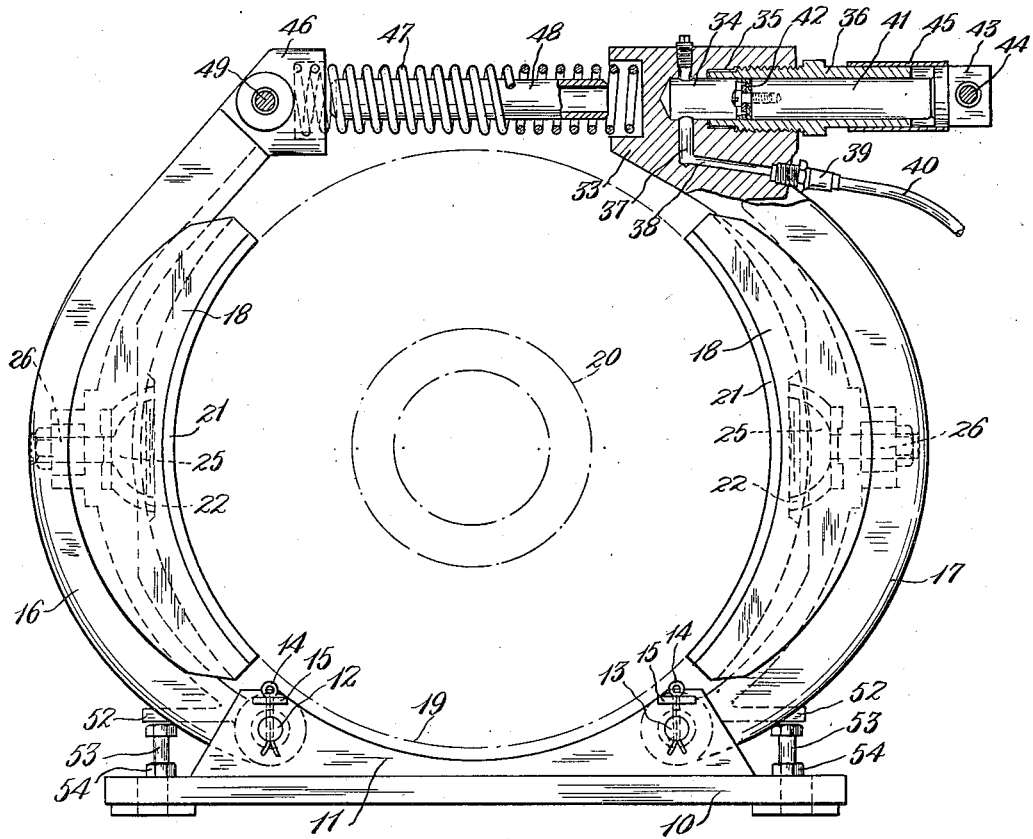

The pivot pin 61, which corresponds with pivot pin 13 in Fig. 1, is of greater length than the latter pin, and outside of the bracket walls 11 it supports two legs 62 which are attached to a magnet housing 63. The upper end of this housing also carries a pair of arms 64 in which I mount a pin 65. Links 66, similar to the links 50, connect the pins 58 and 65 and straddle the spring 59 and the upper end of arm 56. The coil of the electromagnet is indicated at 67. The core or armature 68 is slidable within the coil, and at its outer extremity is pivotally connected with brake arm 56 by means of a pivot pin 69.

In this second form of the invention, magnetic force is employed to hold the brake shoes away from the brake drum during normal operation of the revoluble element 20. The brakes are applied by the opening of a suitable switch in the circuit furnishing current to the coil 67, when the coil spring 59 of course exerts equal tension upon the two brake arms and applies the two brake shoes with equalized pressure. The brakes are also applied automatically whenever current in the line fails for any reason, which is of course a desirable feature when the brake is used upon hoists and the like.

In the foregoing description I have necessarily gone somewhat into detail in order to explain fully the embodiments of the invention herein illustrated, but I desire it to be understood that such detailed disclosures are not to be construed as amounting to limitations except as they may be included in the appended claims.

Having thus described my invention, I claim:

1. In a brake, a drum arranged for attachment to a revoluble element, a brake arm pivotally mounted adjacent said drum, and a brake shoe carried by said arm adapted to engage the cylindrical part of said drum, said arm having a spherical socket therein, a hollow spherical element carried by the shoe fitting in said socket, and a bolt mounted in the arm and projecting through an opening in said spherical element, the head of the bolt being spherical and fitting against the inner surface of said spherical element.

2. In a brake, a drum arranged for attachment to a revoluble element, a brake arm pivotally mounted adjacent said drum, and a brake shoe carried by said arm adapted to engage the cylindrical part of said drum, said arm having a spherical socket therein, a hollow spherical element carried by the shoe fitting in said socket, a bolt slidably mounted in the arm and projecting through an opening in said spherical element, the head of the bolt being spherical and fitting against the inner spherical surface of said hollow spherical element, and a spring mounted in the arm acting to pull said spherical element into said socket.

WILLIAM G. WEHR.